UNITED STATES PATENT OFFICE.

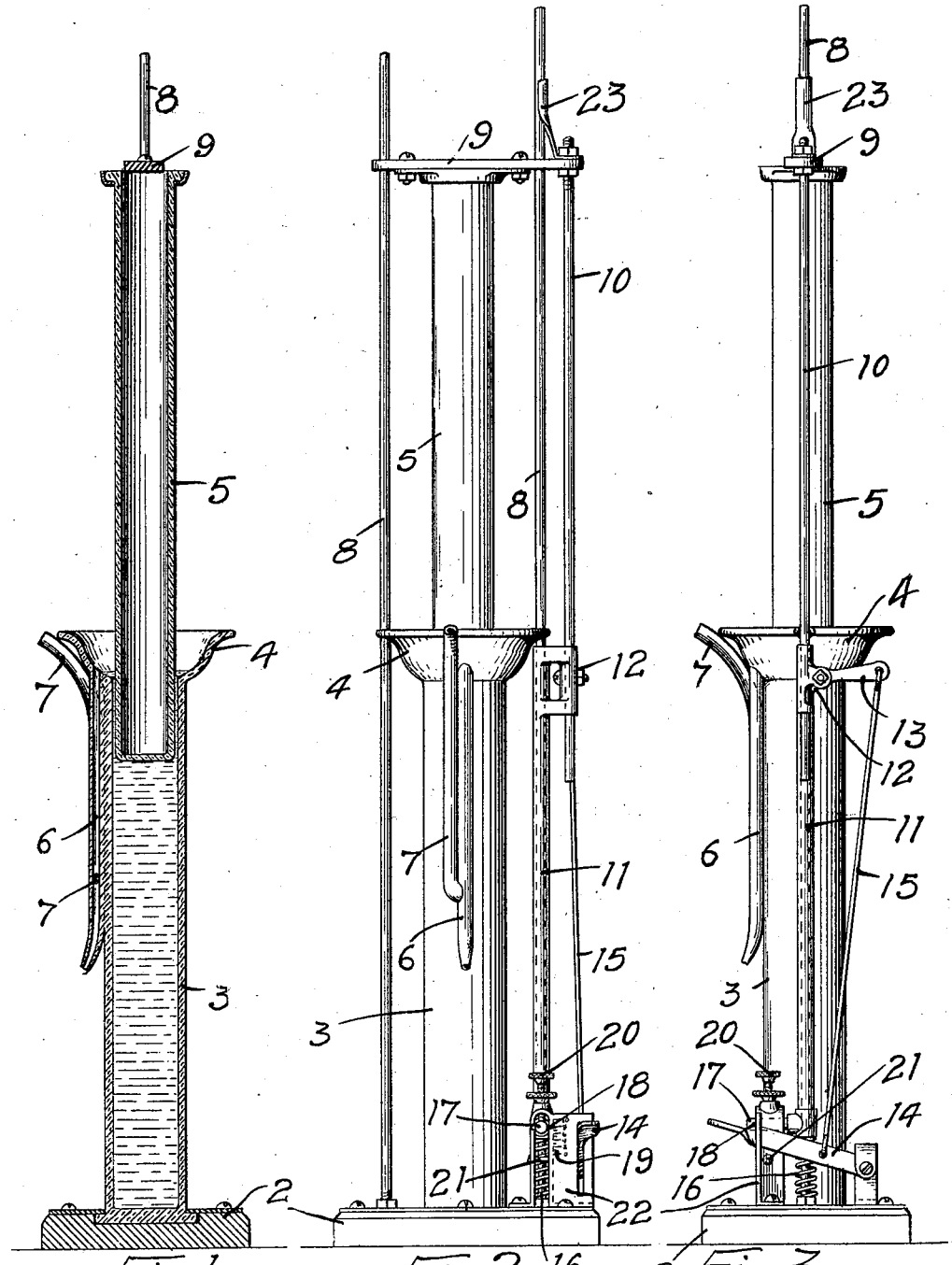

HETMAN O. JOHNSON, OF GROVE CITY, MINNESOTA.

LIQUID-DELIVERING MACHINE.

No. 903,196.  Specification of Letters Patent.  Patented Nov. 10, 1908.

Application filed February 21, 1908.  Serial No. 416,984.

*To all whom it may concern:*

Be it known that I, HETMAN O. JOHNSON, of Grove City, Meeker county, Minnesota, have invented certain new and useful Improvements in Liquid-Delivering Machines, of which the following is a specification.

My invention relates to machines adapted to deliver a predetermined quantity of liquid with each operation and is designed particularly for delivering a certain amount of sulfuric acid required to determine the percentage of butter fat in milk.

The object of my invention is to provide means whereby exactly the desired amount of sulfuric acid can be obtained for testing the milk without danger of contact of the acid with the hands or the clothing.

My invention consists generally in various constructions and combinations, all as hereinafter described and particularly pointed out in the claims.

In the accompanying drawings, forming part of this specification; Figure 1 is a vertical sectional view of an acid-delivering device embodying my invention. Fig. 2 is a front view of the apparatus. Fig. 3 is a side view.

In the drawing, 2 represents a suitable base or support wherein an upright cylinder 3, preferably of glass is mounted. This cylinder has an open top surrounded by a lip or ledge 4. Within the cylinder I arrange a plunger 5 also preferably of glass and adapted to slide up and down within the cylinder, sufficient space being provided between the plunger and the wall of the cylinder to allow the acid to flow therethrough and rise to the top of the cylinder when displaced by the descending plunger. It will be understood that as the plunger descends with a step by step movement the liquid displaced will rise to the top of the cylinder and flow out through the discharge spout 6 provided for the purpose. This spout has a suitable vent 7.

When the rod 15 if drawn down by the movement of the lever 14, the lever 13 of the clutch device will grip the rod 10 and draw it and the plunger 5 downward, the cross head 9 sliding on the guide rods 8. When the lever 14 is released, the clutch lever 13 will be returned to its normal position, releasing the rod 10 and allowing the clutch device 12 to slide upwardly on said rod to obtain a fresh grip thereon. A portion of the liquid having been forced out of the cylinder, the plunger will obviously remain in its depressed position and be slowly fed to the bottom of the cylinder as the lever 14 is operated.

The cylinder is made of glass for two purposes, it is not affected by the action of the acid and the operator can easily determine the level of the liquid therein. The plunger is preferably made of glass so it will not be affected by the action of the acid.

On each side of the cylinder I provide upright guide rods 8. A cross head 9 is slidable on said rods and is attached to the upper end of the plunger 5. A rod 10 is connected at its upper end to the cross head 9 and a tube 11 is arranged to slide on one of the rods 8 and is provided with a clutch device 12 having a lever 13 and adapted to grip the rod 10. A treadle 14 is mounted on the base and is connected by a rod 15 with the lever 13. A spring 16 is coiled on the guide rod beneath the tube 11 and is compressed by the downward movement of said tube.

An arm 17 is mounted on the lower end of the tube 11 and carries an indicator 18 adapted to move past the graduated scale 19. A thumb screw 20 is provided in position to engage the arm 17 and limit its upward movement. The depression of said arm and the downward stroke of the plunger is limited by a pin 21 arranged in the path of said arm. Any suitable means may be provided to guide the arm 17 and the treadle, but I prefer to provide an upright plate 22 mounted on the base and suitably slotted to receive the arm 17 and the treadle 14. A flat spring 23 is mounted on the cross head 9 and arranged to bear on one of the guide rods.

To operate the device, the treadle 14 is depressed whereupon the clutch device will grip the rod 10 and draw the cross head 9 downward and force the plunger into the liquid in the cylinder. Generally in testing milk, $17\tfrac{5}{10}$ millimeters of sulfuric acid is used, and the thumb screw having been adjusted properly, each depression of the treadle will cause the delivery of this amount of acid through the spout 6. Whenever desired the thumb screw may be adjusted to vary the delivery of acid, which may be desirable owing to difference in the strength or condition of the acid. The acid discharged through the spout may be received in a measure or other suitable receptacle and the butter fat in the milk easily and accurately determined without having the acid in contact with the hands or getting it on the clothing.

This apparatus while designed particularly for delivering specified quantities of sulfuric acid, may be utilized for delivering other kinds of liquid.

I claim as my invention:

1. A device of the class described, comprising an upright tube adapted to contain liquid, such as sulfuric acid, and having a discharge spout, a plunger slidable in said tube, the liquid being forced upwardly therein around said plunger as it descends, a crosshead connected with said plunger, guides therefor, mechanism including a manually operated lever connected with said crosshead for forcing said plunger into said tube and having means whereby the degree of such movement may be regulated according to the quantity of liquid desired.

2. The combination, with an upright cylinder adapted to contain a liquid and having a discharge spout, of a plunger operating in said cylinder, the liquid displaced by said plunger flowing upwardly around said plunger to the inlet to said delivery spout, a step by step mechanism and means connecting it with said plunger and a scale device provided in connection with said step by step mechanism, whereby the degree of movement of said plunger and the amount of liquid displaced thereby can be regulated.

3. The combination, with a cylinder adapted to contain liquid and having a discharge spout, of a plunger slidably arranged within said cylinder, a cross head attached to said plunger, guide rods for said cross head, a rod depending from said cross head, a tube slidable on one of said guide rods, a step by step mechanism and means connecting it with said tube and arranged to clamp said rod and draw said cross head downwardly, whereby said plunger will be forced into said cylinder, said tube sliding on its guide rod during the movement of said cross head.

4. The combination, with an upright cylinder having a passage spout and a graduated scale and adapted to contain liquid, of a plunger slidably arranged within said cylinder, guide rods for said plunger, a step by step mechanism and means connecting it with said plunger, said mechanism including a treadle and a clutch device, an indicator arranged to travel past a graduated scale, and means for limiting the movement of said indicator and the stroke of said plunger.

5. The combination, with an upright cylinder having a discharge spout and a graduated scale and adapted to contain liquid, of a plunger slidable therein, a guide rod for said plunger, a tube slidable on said guide rod, a depending rod, connecting it to said plunger, a clutch device connected to said tube and arranged to engage said depending rod, a spring for normally holding said tube in its raised position, an indicator hand arranged to move past a graduated scale, means for regulating the stroke of said tube and indicator hand, and mechanism for operating said clutch device.

6. A device of the class described comprising an upright glass tube adapted to contain liquid such as sulfuric acid and having a discharge spout, a glass plunger slidable in said tube, the liquid being forced upwardly therein around said plunger as it descends, means including a manually operated lever and a step by step mechanism for feeding said plunger into said tube, the quantity of liquid discharged depending upon the degree or extent of the feeding movement, and means whereby the operator may regulate such movement according to the quantity of liquid desired.

In witness whereof, I have hereunto set my hand this 14th day of February 1908.

HETMAN O. JOHNSON.

Witnesses:
JOHN N. JOHNSON,
A. O. LEVANDER.